Sept. 25, 1962 A. G. RATZ 3,055,588
TRANSFER FUNCTION COMPUTER
Filed Oct. 1, 1958
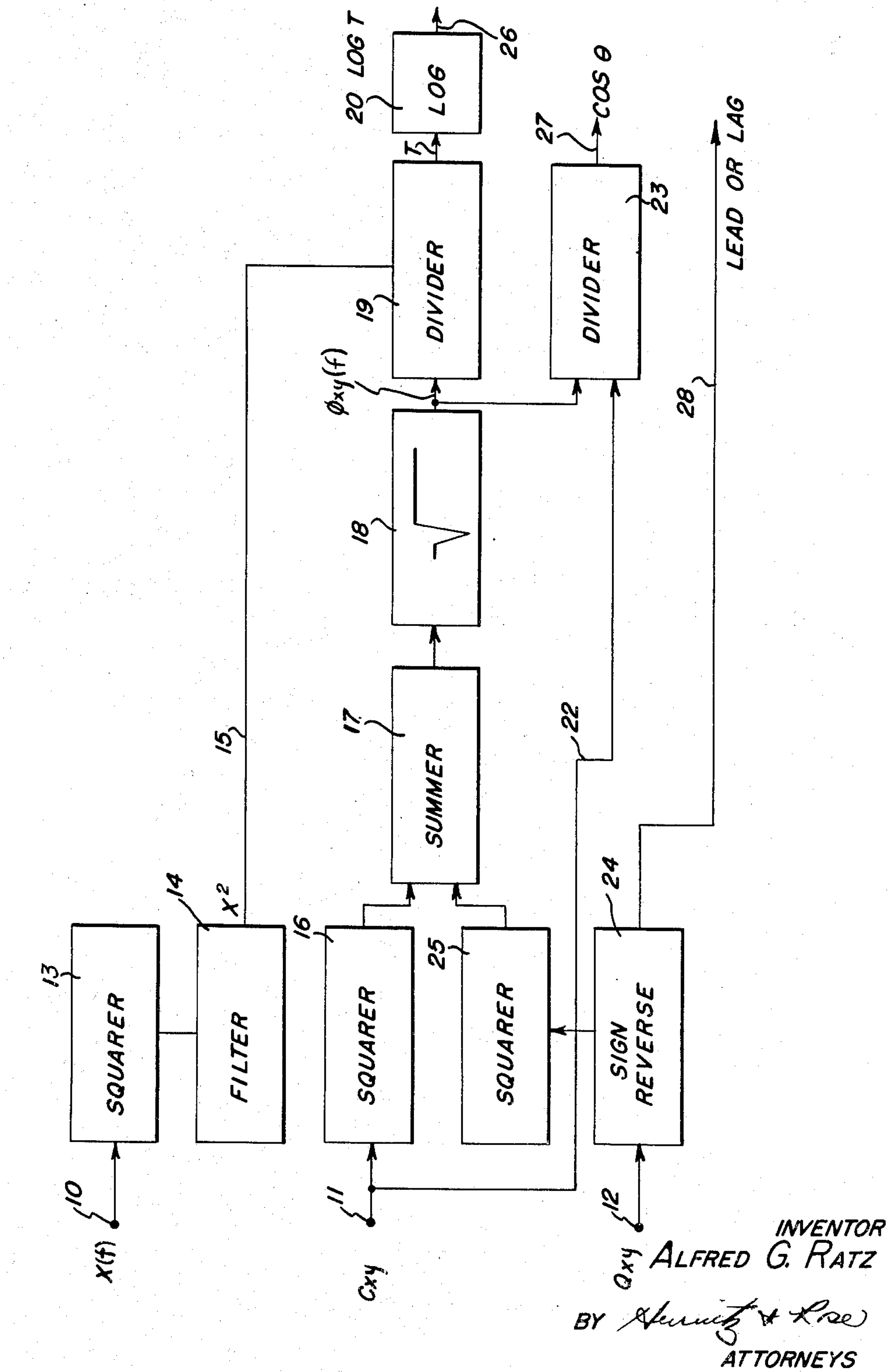
INVENTOR
ALFRED G. RATZ
BY Hurvitz & Rose
ATTORNEYS 3,055,588
Patented Sept. 25, 1962

3,055,588
TRANSFER FUNCTION COMPUTER

Alfred G. Ratz, Trenton, N.J., assignor, by mesne assignments, to Electro-Mechanical Research, Inc., Sarasota, Fla., a corporation of Connecticut Filed Oct. 1, 1958, Ser. No. 764,565
3 Claims. (Cl. 235—193)

The present invention relates generally to a transfer function computer and more particularly to a device for computing a transfer function in response to cross-correlation functions taken between a stimulus a response to the stimulus.

Transfer functions define the precise relation between a stimulus and the response to the stimulus. The concept of transfer function is important especially in the fields of design and analysis of servo-mechanisms, transducers, aerodynamic systems, various electrical networks and the like.

The present computer utilizes as inputs, (1) a spectrum function $X(t)$ representing a stimulus $X(t)$, (2) a quadrature phase spectrum cross-correlation function, and (3) an in-phase spectrum cross-correlation function. The latter functions are respectively known in the art as the co-spectrum and the quadrature spectrum of the stimulus and of a response to the stimulus.

The stimulus function spectrum, representing a time-varying stimulus, is hereinafter denominated as $X(f)$, the response function spectrum, representing a response to the time-varying stimulus, is hereinafter denoted as $Y(f)$, and the in phase and quadrature spectrums cross-correlation functions as $Cxy(f)$ and $Qxy(f)$, respectively. These cross correlation functions may be derived in any convenient fashion, but a preferred system for the purpose is that disclosed in my concurrently filed application Serial No. 764,613 entitled Cross Correlation Computer and assigned to the same assignee.

The transfer function computer of the present invention provides at its output the transfer function $$T(f)=\frac{Y(f)}{X(f)}$$

in terms of the following:

(1) absolute magnitude of $T(f)$, i.e. $|T(f)|$
(2) phase of $T(f)$ for all $f$, expressed as $\cos\theta(f)$
(3) information as to whether $\theta(f)$ is leading or lagging
(4) $\log T(f)$
(5) $\log (f)$ Items (4) and (5) permit a direct Bode plot.

It is, accordingly, an object of the present invention to provide a computer for computing transfer functions as a function of $X(f)$ and $Y(f)$.

It is another object of the invention to provide a system for computing $T(f)$ from values of $Qxy(f)$ and $Cxy(f)$.

Another object of the invention resides in the provision of a computer for computing the absolute value and phase of a transfer function as a function of frequency.

The above and still further objects, features and advantages of the present invention will become apparent upon consideration of the following detailed description of one specific embodiment thereof, especially when taken in conjunction with the accompanying drawings, wherein:

The single figure of the drawings is a block diagram of a computer according to the invention.

Referring now more specifically to the accompanying drawings, the reference numeral 10 denotes an input terminal to which is applied the frequency function $X(f)$ derived from a time function $X(t)$, as by a process of frequency-scanning spectrum analysis. The reference numeral 11 denotes an input terminal to which is applied the frequency function $Cxy(f)$ representing the co-spectrum of $X(f)$ taken with $Y(f)$. The reference numeral 12 denotes an input terminal to which is applied the frequency function $Qxy(f)$ representing the quadrature spectrum of $X(f)$ taken with $Y(f)$. Both $X(f)$ and $Y(f)$ may be derived from a frequency scanning spectrum analysis responsive to $X(t)$ and $Y(t)$, where $Y(t)$ is a time function representing a response to $X(t)$.

The co-spectrum and the quadrature spectrum of $X(f)$ and $Y(f)$ may now be defined, respectively as, $$Cxy(f)=X(f)Y(f)\cos\theta$$

and $$Qxy(f)=X(f)Y(f)\sin\theta$$

where $\theta$ is the phase angle between X and Y at each frequency. The functions $Cxy(f)$ and $Qxy(f)$ may be derived as from conventional computers selected for the purpose, or from the devices disclosed in my aforementioned application.

The terminal 10 is connected to a squarer 13 and a filter 14 in cascade, the filter removing frequencies above those of interest, which may be generated by the squarer 13. The filter 14 provides a square, frequency function $X^2$ on an output lead 15.

The function $Cxy(f)$ is applied via terminal 11 to a squarer 16, a summer 17, a square-rooter 18, a divider 19 and a logarithm computer 20, all in cascade. The lead 15 is also connected to divider 19. The terminal 11 is further connected directly via lead 22 to a divider 23. To the latter is also applied the output of square-rooter 18.

The function $Qxy(f)$ is applied through a sign reversing network 24 to a squarer 25, and the latter supplies input to summer 17. The sign reversing network is employed to provide a positive signal input to the squarer 25 at all times.

The theoretical considerations upon which the analyzer is based can be summarized as follows. The component under observation has a transfer function $T(f)$, relating a stimulus $x(t)$ and its output signal $y(t)$, both of which are random functions. Now, assuming $x(t)$ is ergodic, we can write the following:

$$\psi xy(\tau)=\lim_{T\to\infty}\frac{1}{2T}\int_{-T}^{+T}x(t)y(t-\tau)\,dt \quad (1)$$

$$y(t)=\int_{-\infty}^{+\infty}h(\zeta)x(t-\zeta)\,d\zeta \quad (2)$$

where $\psi xy(\tau)$ represents the cross-correlation function between the stimulus and its response, and $h(\zeta)$ represents the response of the component to a unit impulse.

Substituting Equation (2) into Equation (1) and reversing the order of integration, which is allowable in this yields:

$$\psi_{xy}(\tau)=\int_{-\infty}^{+\infty}h(\zeta)\psi_{xx}(\tau-\zeta)\,d\zeta \quad (3)$$

where $$\psi_{xx}(\tau-\zeta)=\lim_{T\to\infty}\int_{-T}^{+T}x(t)\psi(t+\tau-\zeta)\,dt \quad (4)$$

$\psi xx$ is the auto-correlation function of the input.

Equation 3 has the form of a convolution integral. Therefore, the relationship between input and output can be expressed in the frequency domain as $$\phi_{xy}(f)=T(f)\phi_{xx}(f) \quad (5)$$

If we use the phase of $\phi_{xx}(f)$ as reference then the following relation generally holds, $$\phi_{xy}(f)=\phi_{xy}(f)\div jq_{xy}(f) \quad (6)$$

$\phi_{xy}$, $c_{xy}$, $q_{xy}$ are called the cross-spectrum, co-spectrum and quadrature-spectrum respectively, and $\phi_{xx}(f)$ is the power spectrum of $x(t)$. If $Y(f)$ is the component of $x(t)$ at frequency $f$, then $$\phi_{xx}(f)=\frac{2}{X(f)} \qquad (7)$$

If $Y(f)$ is the frequency component of $y(t)$ at frequency $f$, then since Equation 3 has the form of a convolution integral, $$\phi_{xy}(f)=X(f)Y(f) \qquad (8)$$

If $$\phi_{xy}(f)=\arc\tan\left(\frac{q_{xy}(f)}{C_{xy}(f)}\right) \qquad (9)$$

then $$|T(f)|=\frac{\phi_{xy}(f)}{\overline{X}^2(f)} \qquad (10)$$

and $$T(f)=|T(f)|\underline{/\phi} \qquad (11)$$

It should be noted that since $T(f)$ has been obtained using cross-correlation techniques, extraneous signals affecting the output $y(t)$ and deriving from other inputs or being internally generated by the monitored component itself will have no effect on the calculation of $T(f)$.

In operation, to the squarer 13 is provided the power spectrum $X(f)$ representing a Fourier spectrum of the stimulus. The squarers 16 and 25 generate the functions $\overline{Cxy}(\overline{f})^2$ and $\overline{Qxy}(\overline{f})^2$, respectively, which are summed in summer 17 and the square root of the sum taken by the square rooter 18. Dividing the output of square rooter 18 by $X^2$ generates the absolute value of the transfer function $T(f)$. The logarithm of $T(f)$ is available on lead 26.

Division of the output of square rooter 18 by the function $Cxy$ in divider 23 yields cos $\theta$ on lead 27, and the sign of the output of sign reverser 24, as it appears on lead 28, indicates whether the phase angle $\theta$ is leading or lagging.

Clearly, the function of squarers 16 and 25 are, respectively, to derive $\overline{Cxy}(\overline{f})^2$ and $\overline{Qxy}(\overline{f})^2$. When these are summed and the square root taken we arrive at $\phi xy(f)$. Dividing the latter by $X^2$ yields the absolute value $|T(f)|$ of the desired transfer function. The function cos $\theta$ is obtained by dividing $\phi xy(f)$, available at the output of square rooter 18, into $C_{xy}(f)$ as required by Equation 6. The sign of $Qxy(f)$, as read on lead 28, gives the sign of the angle $\theta$ as established by Equation 6.

While I have described and illustrated one specific embodiment of my invention, it will be clear that variations of the general arrangement and of the details of construction which are specifically illustrated and described may be resorted to without departing from the true spirit and scope of the invention as defined in the appended claims.

What I claim is:

1. A transfer function computer for computing a transfer function, comprising a source of a spectrum representing a stimulus, sources of a co-spectrum and a quadrature spectrum of the spectrum representing the stimulus and of a further spectrum representing response to the stimulus, means for computing a cross spectrum from said co-spectrum and quadrature spectrum, means for deriving the square of the spectrum representing said stimulus, and means for dividing said cross-spectrum by said square of said spectrum representing said stimulus to derive said transfer function.

2. A computer comprising, a source of a spectrum $X(f)$ representing a stimulus, $Y(f)$ being a spectrum representing a response to said stimulus, a source of a co-spectrum $Cxy(f)$ between $X(f)$ and $Y(f)$, a source of a quadrature spectrum $Qxy(f)$ taken between $X(f)$ and $Y(f)$, means for squaring $X(f)$ to derive $\overline{X}(\overline{f})^2$, means for squaring $Cxy(f)$ to derive $\overline{Cxy}(\overline{f})^2$, squaring means for deriving from $Qxy(f)$ the function $\overline{Qxy}(\overline{f})^2$, means for summing $\overline{Cxy}(\overline{f})^2$ and $\overline{Qxy}(\overline{f})^2$, means for deriving the square root function $|\phi xy(f)|$of the sum so derived, means for dividing $|\phi xy(f)|$ by $\overline{X}(\overline{f})^2$ to derive $|T(f),|$ the absolute value of a transfer function relating $Y(f)$ and $X(f)$, means for dividing $|Cxy(f)|$ by $|\phi xy(f)|$ to derive a function of the phase angle $\theta$ of said transfer function, and means for signaling the algebraic sign of $Qxy(f)$.

3. A computer comprising a source of a spectrum $X(f)$ representing a stimulus, $Y(f)$ being a spectrum representing a response to said stimulus, a source of a co-spectrum $Cxy(f)$ between $X(f)$ and $Y(f)$, a source of a quadrature spectrum $Qxy(f)$ taken between $X(f)$ and $Y(f)$, means responsive to $X(f)$ for deriving $\overline{X}(\overline{f})^2$, means for deriving the root mean square of $Cxy(f)$ and $Qxy(f)$, and means for dividing said root-mean-square by $\overline{X}(\overline{f})^2$ to derive $|T(f)|$ the absolute value of a transfer function relating $X(f)$ and $Y(f)$.

References Cited in the file of this patent

"Electronic Analog Computers," (Korn and Korn) McGraw Hill, 1956. Fig. 6.57a, p. 339, Fig. 1.5C, p. 13 relied on.

UNITED STATES PATENT OFFICE

CERTIFICATE OF CORRECTION

Patent No. 3,055,588 September 25, 1962

Alfred G. Ratz

It is hereby certified that error appears in the above numbered patent requiring correction and that the said Letters Patent should read as corrected below.

Column 1, line 21, strike out "X(t)", both occurrences; column 2, line 70, equation (6), for "$\phi_{xy}(f)$", second occurrence, read -- $c_{xy}(f)$ --; column 3, line 30, for "$\overline{Cxy}(\bar{f})^2$ and $\overline{Qxy}(\bar{f})^2$" read -- $\overline{Cxy(f)}^2$ and $\overline{Qxy(f)}^2$ --; line 42, for "$\overline{Cxy}(\bar{f})^2$ and $\overline{Qxy}(\bar{f})^2$" read -- $\overline{Cxy(f)}^2$ and $\overline{Qxy(f)}^2$ --; column 4, line 24, for "$\bar{X}(\bar{f})^2$" read -- $\overline{X(f)}^2$ --; line 25, for "$\overline{Cxy}(\bar{f})^2$" read -- $\overline{Cxy(f)}^2$ --; line 26, for "$\overline{Qxy}(\bar{f})^2$" read $\overline{Qxy(f)}^2$ --; line 27, for "$\overline{Cxy}(\bar{f})^2$ and $\overline{Qxy}(\bar{f})^2$" read -- $\overline{Cxy(f)}^2$ and $\overline{Qxy(f)}^2$ --; line 29, for "$\bar{X}(\bar{f})^2$" read -- $\overline{X(f)}^2$ --; line 31, for "$|T(f),|$" read -- $|T(f)|$, --; same column 4, line 41, for "$\bar{X}(\bar{f})^2$" read -- $\overline{X(f)}^2$ --; line 44, for "$\bar{X}(\bar{f})^2$" read -- $\overline{X(f)}^2$ --.

Signed and sealed this 2nd day of April 1963.

(SEAL)
Attest:

ESTON G. JOHNSON

Attesting Officer

DAVID L. LADD

Commissioner of Pate